(12) United States Patent
Badent et al.

(10) Patent No.: US 12,059,720 B2
(45) Date of Patent: Aug. 13, 2024

(54) JOINING TOOL UNIT

(71) Applicant: TOX PRESSOTECHNIK GMBH & CO. KG, Weingarten (DE)

(72) Inventors: Michael Badent, Weingarten (DE); Wolfgang Pfeiffer, Hagnau (DE); Marcus Matzke, Ravensburg (DE)

(73) Assignee: TOX PRESSOTECHNIK GMBH & CO. KG, Weingarten (DE)

( * ) Notice: Subject to any disclaimer, the term of this patent is extended or adjusted under 35 U.S.C. 154(b) by 0 days.

(21) Appl. No.: 18/435,007

(22) Filed: Feb. 7, 2024

(65) Prior Publication Data

US 2024/0181519 A1  Jun. 6, 2024

Related U.S. Application Data

(63) Continuation of application No. PCT/EP2022/068682, filed on Jul. 6, 2022.

(30) Foreign Application Priority Data

Aug. 13, 2021 (DE) ..................... 10 2021 121 090.9

(51) Int. Cl.
*B21D 39/03* (2006.01)
(52) U.S. Cl.
CPC ................. *B21D 39/031* (2013.01)
(58) Field of Classification Search
CPC .................................................. B21D 39/031
See application file for complete search history.

(56) References Cited

U.S. PATENT DOCUMENTS

2018/0250734 A1  9/2018  Savoy et al.
2021/0178457 A1*  6/2021  Savoy .................. B21K 25/005

FOREIGN PATENT DOCUMENTS

| DE | 10 2010 006 400 A1 | 8/2011 |
| DE | 21 2015 000 312 U1 | 2/2018 |
| DE | 10 2018 202 140 A1 | 8/2019 |

OTHER PUBLICATIONS

German Search Report (Application No. 10 2021 121 090.9) dated Apr. 11, 2022 (10 pages).

(Continued)

*Primary Examiner* — Jason L Vaughan
*Assistant Examiner* — Amanda Kreiling
(74) *Attorney, Agent, or Firm* — BURR PATENT LAW, PLLC

(57) ABSTRACT

A joining tool unit including a hold-down device, a movable tool, a tool counterpart element, a drive unit, a light source and a control unit. The hold-down device and the movable tool are provided opposite the tool counterpart element, the hold-down device being movable in the direction of the tool counterpart element by the drive unit. The joining tool unit joins a workpiece arranged on the joining tool unit by movement of the movable tool relative to the tool counterpart element. The control unit performs open- and/or closed-loop control of the drive unit, and the control unit is designed for open- and/or closed loop control of the light source. The joining tool unit is designed to move the hold-down device in the direction of the tool counterpart element to a position at which the hold-down device and the tool counterpart element touch the workpiece arranged on the joining tool unit.

11 Claims, 4 Drawing Sheets

(56) References Cited

OTHER PUBLICATIONS

International Search Report and Written Opinion (Application No. PCT/EP2022/068682) dated Oct. 17, 2022 (15 pages).
International Preliminary Report on Patentability (with Chapter II Claims) (Application No. PCT/EP2022/068682) dated Dec. 14, 2023 (with English translation) (27 pages).

* cited by examiner

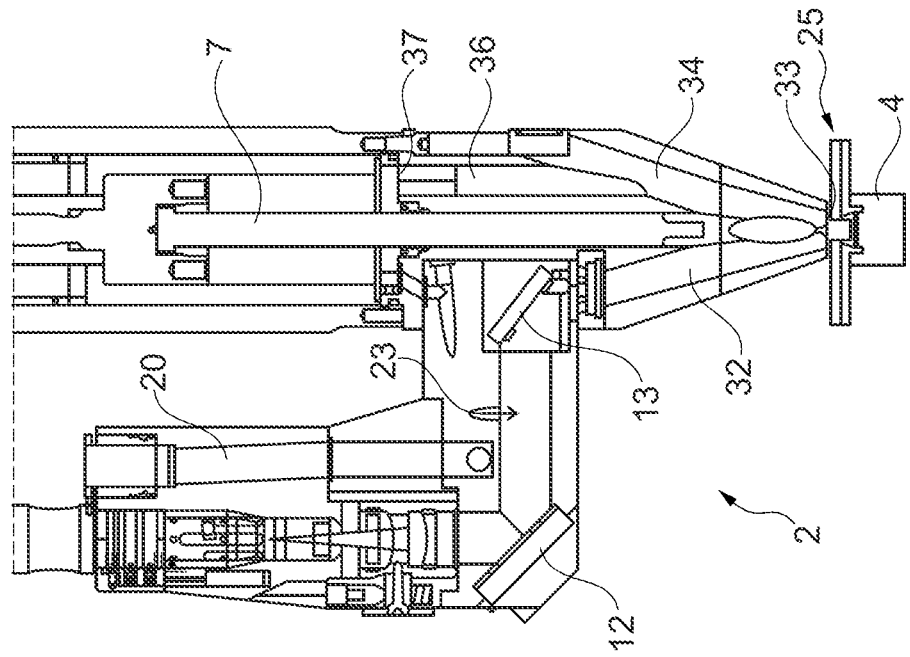
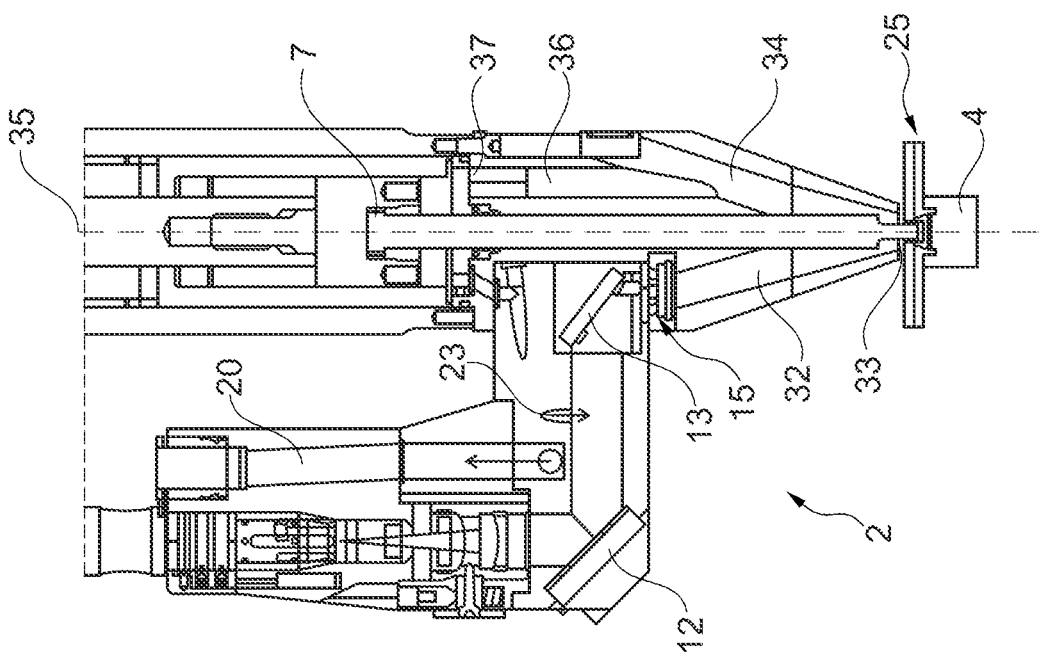

JOINING TOOL UNIT

CROSS REFERENCE TO RELATED APPLICATIONS

This application is a continuation of International Application No. PCT/EP2022/068682 filed Jul. 6, 2022, which designated the United States, and claims the benefit under 35 USC § 119 (a)-(d) of German Application No. 10 2021 121 090.9 filed Aug. 13, 2021, the entireties of which are incorporated herein by reference.

FIELD OF THE INVENTION

The present invention relates to a joining tool unit.

BACKGROUND OF THE INVENTION

A joining tool unit, in particular, a joining tool unit for clinching, is already known. For example, there is known a joining tool unit in which by means of laser beam thermal introduction a location, which is intended to be joined, of a workpiece is heated in order to join the workpiece at this heated location in the heated state with the joining tool unit.

A disadvantage of the known joining tool unit is that the known joining tool unit has comparatively long joining cycle times. Similarly, it is known to be a disadvantage that, as a result of the laser use, a radiation protection of employees who work with the joining tool unit or who may be present in the region of the joining tool unit has to be ensured. In the known joining tool unit, to this end the complete joining tool unit is provided with a surrounding housing which is configured to be impermeable to light for the light of the laser beam. The known joining tool unit is thereby configured in a comparatively expensive and complex manner.

SUMMARY OF THE INVENTION

An object of the present invention is to provide an improved joining tool unit. In particular, an object of the present invention is to provide an improved joining tool unit, by means of which a thermally supported joining method can be carried out.

The present invention is based on a joining tool unit, wherein the joining tool unit has a holding-down member, a movable tool, a tool counter-element, a drive unit, a light source and a control unit, wherein the holding-down member and the movable tool are provided opposite the tool counter-element, wherein the holding-down member can be moved in the direction of the tool counter-element by the drive unit, wherein the joining tool unit is configured to join a workpiece which is arranged on the joining tool unit by a movement of the movable tool relative to the tool counter-element, wherein the control unit is configured to control and/or adjust the drive unit, wherein the control unit is configured to control and/or adjust the light source, wherein the joining tool unit is configured to move the holding-down member in the direction of the tool counter-element as far as a position, at which the holding-down member and the tool counter-element touch the workpiece which is arranged on the joining tool unit, wherein the joining tool unit is configured to begin irradiation or illumination of a joining location of the workpiece with the light of the light source when the holding-down member has reached the position. A comparatively short joining cycle time can thereby be achieved. The joining tool unit is also thereby constructed in a comparatively cost-effective manner.

For example, a workpiece comprises two or more workpiece portions which can be joined to each other by means of the joining tool unit. The joining tool unit is designed, for example, to set a functional element, for example, for setting a punching nut, a rivet nut, a press-in nut, a bolt, a screw element on the workpiece and/or for clinching or press-joining and/or for setting a rivet, such as, for example, a clinch rivet, a solid-stamp rivet or a half-hollow stamp rivet. A functional element can be riveted, pressed, stamped or clinched, for example, in the workpiece, with the joining tool unit. For example, a plurality of workpiece portions of the workpiece can be connected to each other with the joining tool unit, for example, with a connection element, such as a rivet or without a connection element, for example, with a clinching operation.

It is conceivable for the workpiece also to comprise precisely one workpiece portion. For example, a functional element is fixed to the workpiece in one joining operation. For example, a functional element is fixed to the single workpiece portion in one joining operation.

For example, two or more workpiece portions which are connected to each other by the joining tool unit in a joining operation by means of a joining connection can be arranged between the movable tool and the tool counter-element. The workpiece portions can be made of different materials. For example, the workpiece portions may have different metal compositions or different material hardnesses. Preferably, the workpiece portion against which the movable tool bears during a joining operation is harder and/or more brittle than the additional workpiece portion of the workpiece.

For example, the joining tool unit is constructed in such a manner that the workpiece portion on which the movable tool engages can be heated by a light of the light source. As a result of it being possible to heat the workpiece which is intended to be joined by the joining tool unit, it is possible to produce a joining connection between a hard and/or brittle workpiece portion and a workpiece portion made from another, for example, softer material. As a result of it being possible to heat the workpiece which is intended to be joined by the joining tool unit, an improvement of already possible or currently known connection applications can be achieved.

For example, the movable tool is movably provided along a movement axis of the joining tool unit. For example, the movable tool is exclusively provided so as to be linearly movable along the movement axis of the joining tool unit. For example, the drive unit comprises a linear drive, such as, for example, a pneumatic/hydraulic, hydraulic, pneumatic and/or electric drive unit.

For example, the movable tool is in the form of a bottom die unit or a stamp unit. For example, the tool counter-element is in the form of a bottom die unit or a stamp unit. It is conceivable for the movable tool to be in the form of a stamp unit and the tool counter-element to be in the form of a bottom die unit, or vice versa. It is also conceivable for the joining tool unit to have two movable tools, wherein the movable tools are present on the joining tool unit opposite each other.

For example, the joining tool unit is configured to join the workpiece, in the state in which a workpiece is arranged on the joining tool unit, by moving the movable tool in the direction of the tool counter-element.

For example, the movable tool and/or the tool counter-element has/have a joining face. For example, a workpiece which is arranged on the joining tool unit is joined at the joining location by means of the joining face, that is to say, the joining tool unit is in direct contact with the workpiece during the joining operation via the joining face.

It is conceivable for the joining tool unit to be provided in such a manner that in the state in which a workpiece is arranged on the joining tool unit, the movable tool, for example, the joining face of the movable tool, has, before the start of a relative movement of the movable tool relative to the tool counter-element, a spacing between 2 cm and 20 cm, between 2 cm and 15 cm or between 2 cm and 10 cm with respect to the location of the workpiece to be joined. For example, the movable tool, for example, the joining face of the movable tool, is spaced apart before the start of a relative movement of the movable tool relative to the tool counter-element from the location of the tool to be joined by 2 cm, 2.5 cm, 3 cm, 3.5 cm, 4 cm, 4.5 cm, 5 cm, 6 cm, 7 cm, 8 cm, 9 cm, 10 cm, 15 cm or 20 cm. For example, the spacing is the distance between the joining face of the movable tool and the contact face of the workpiece, wherein the contact face of the workpiece is the location with which the joining face of the movable tool engages in the joining operation.

A particularly maximum movement speed of the movable tool relative to the tool counter-element is between 0.1 m/s and 2 m/s, for example, between 1 m/s and 2 m/s. A particularly maximum movement speed of the movable tool relative to the tool counter-element is 0.1 m/s, 0.5 m/s, 0.8 m/s, 1 m/s, 1.1 m/s, 1.2 m/s, 1.3 m/s, 1.4 m/s, 1.5 m/s, 1.6 m/s, 1.7 m/s, 1.8 m/s, 1.9 m/s or 2 m/s.

For example, the light source is in the form of a laser. It is conceivable for the laser to be able to be operated with pulsed and/or continuous laser operation. For example, a wavelength of the light source is adapted to an absorption maximum of the material of the workpiece to be processed so that an introduction of heat into the workpiece in a manner which is as efficient as possible in terms of energy by the light of the light source is achieved.

It is further proposed that the holding-down member have a light guiding system. The joining tool unit is thereby provided in a comparatively simplified manner, in particular, in a comparatively cost-effective manner. For example, a joining tool unit which does not require any additional surrounding housing for beam protection of employees can thereby be achieved.

For example, the light guiding system encloses the light of the light source along a light beam of the light so that the light is outwardly screened off in a light-impermeable manner by the light guiding system in a radial direction relative to the light beam. For example, the light guiding system of the holding-down member outwardly screens off the light along the light beam thereof in a light-impermeable manner.

It is also conceivable for the light guiding system to be formed on the tool counter-element. For example, the holding-down member and the tool counter-element are provided on the joining tool unit opposite each other.

For example, a stamp unit which comprises the holding-down member and the movable tool is provided. For example, the holding-down member is in the form of a stamp holding-down member and the movable tool is in the form of a stamp tool. For example, the tool counter-element is provided in the form of a bottom die unit.

It is also conceivable for a bottom die unit which comprises the holding-down member and the movable tool to be provided. For example, the holding-down member is in the form of a bottom die holding-down member and the movable tool is in the form of a bottom die. For example, the tool counter-element is provided in the form of a stamp unit.

It is conceivable for the joining tool unit to comprise the stamp unit and/or the bottom die unit.

For example, the holding-down member is configured to perform a holding-down function. For example, the holding-down member is provided in a movable manner relative to the tool counter-element so that a spacing between the holding-down member and the tool counter-element is variable. For example, relative movement of the holding-down member and tool counter-element is brought about by the drive unit.

The light guiding system is preferably configured on the holding-down member in such manner that the light guiding system surrounds the light of the light source along the light beam so that the light is screened off in a radial direction relative to the light beam outwardly by the light guiding system.

For example, a recess of the light guiding system is provided in the holding-down member, in particular, a cylindrical recess, wherein along a cylinder axis of the recess, for example, the longitudinal extent of the recess, the light can be directed in the direction of the workpiece. The recess is provided, for example, in the form of a hole, for example, in the form of a through-hole, in the holding-down member. It is also conceivable for the recess to be present in a tubular manner, for example, in the form of a tube, in the holding-down member. However, it is also conceivable for the light guiding system to have a glass fiber and for the glass fiber to be fixed to the holding-down member.

It is also proposed that the light guiding system be provided on the holding-down member in such a manner that a light beam of the light of the light source shines on the joining location exclusively at an angle greater than 0° relative to a movement axis of the movable tool.

Preferably, the light guiding system is configured in such a manner that the light beam of the light of the light source shines on the joining location of the workpiece exclusively in an angular range from 5° to 40° relative to a movement axis of the movable tool. For example, a longitudinal axis of the recess is provided in an angular range from 5° to 40° relative to the movement axis of the movable tool in the holding-down member.

For example, an additional recess, for example, a second recess, is provided in the holding-down member. It is conceivable for the second recess to be provided in a mirror-symmetrical manner relative to the first recess in the holding-down member. Preferably, the mirror axis extends parallel with the movement axis of the movable tool. If, for example, the movement axis of the movable tool extends centrally through the holding-down member, the movement axis preferably corresponds to the mirror axis.

For example, the first and second recesses are configured in the holding-down member in such a manner that the light of the light source is guided along the first recess onto the workpiece if the holding-down member is positioned against the workpiece and that the light, which is reflected by the workpiece, of the light source is guided along the second recess. For example, the holding-down member comprises a radiation trap or a radiation sump, in which the reflected light is trapped and absorbed. A protective cab can be dispensed with as a result of the light beam being guided along the first and second recesses in the holding-down member.

Furthermore, it is conceivable for the light guiding system to have a shutter. For example, illumination of a joining location by the light of the light source can be activated or deactivated by means of the shutter. For example, the shutter is in the form of an optical closure, for example, in the form of a mechanical and/or electronic closure, for example, a movable element. For example, the shutter can be controlled by means of the control unit.

Furthermore, it is proposed that the holding-down member be movable by the drive unit in the direction of the tool counter-element. A comparatively compact structure of the joining tool unit is thereby brought about.

For example, the control unit is configured to move the holding-down member, in particular, by the drive unit, in the direction of the tool counter-element until the holding-down member touches the workpiece which is arranged on the joining tool unit.

For example, the holding-down member is provided in a movable manner relative to the tool counter-element. For example, the holding-down member and the movable tool are provided in a manner movable, independently of each other, by the drive unit. The holding-down member is movable, for example, by the drive unit, in the direction of the tool counter-element. It is conceivable for the holding-down member and the tool counter-element to be provided in a manner movable relative to each other by the drive unit. For example, the drive unit can move the holding-down member and/or the tool counter-element.

For example, the holding-down member and the tool counter-element can be moved toward each other so that an arranged workpiece can be clamped between the holding-down member and the tool counter-element. For example, on the one hand, a workpiece can thereby be fixed for a joining operation, on the other hand, workpiece portions of the workpiece can also be clamped against each other so that a thermal transmission from one workpiece portion to another workpiece portion of the workpiece is improved. It is also conceivable for a region between the holding-down member and workpiece to be closed by the holding-down member being in a state placed against the workpiece so that screening of the light is thereby brought about.

A particularly maximum movement speed of the holding-down member relative to the tool counter-element is between 0.1 m/s and 2 m/s, for example, between 1 m/s and 2 m/s. A particularly maximum movement speed of the holding-down member relative to the tool counter-element is 0.1 m/s, 0.5 m/s, 0.8 m/s, 1 m/s, 1.1 m/s, 1.2 m/s, 1.3 m/s, 1.4 m/s, 1.5 m/s, 1.6 m/s, 1.7 m/s, 1.8 m/s, 1.9 m/s or 2 m/s.

For example, the holding-down member, the light guiding system and/or the light source are arranged relative to or against each other so that the holding-down member, the light guiding system and/or the light source are provided in a movable manner exclusively together. For example, the holding-down member, the light guiding system and/or the light source are provided in a state fixed in position relative to each other.

Furthermore, it is conceivable for the holding-down member to have a scraper function. For example, the movable tool is moved away from the workpiece at the end of the joining operation of the workpiece relative to the tool counter-element. In this case, it is conceivable for the workpiece to remain bonded to the movable tool, wherein the holding-down member remains in this case, for example, in the position thereof placed against the workpiece relative to the tool counter-element so that the workpiece remains fixed in position as a result of the state thereof clamped between the holding-down member and the tool counter-element and is therefore scraped by the movable tool.

Furthermore, it is proposed that the control unit of the joining tool unit be configured to end irradiation or illumination of the joining location of the arranged workpiece with the light of the light source at the same time as the start of the movement of the movable tool or chronologically after the start of the movement of the movable tool. A joining cycle time is thereby comparatively shorter.

For example, the control unit is configured to switch off the light source at the same time as the start of the movement of the movable tool or chronologically after the start of the movement of the movable tool and therefore to end irradiation or illumination of the joining location of the arranged workpiece with the light of the light source. It is also conceivable that the control unit be configured to end irradiation or illumination of the joining location of the arranged workpiece with the light of the light source and subsequently to start a movement of the movable tool.

For example, the joining tool unit is configured, relative to a joining operation of the workpiece by the joining tool unit, so that a movement of the movable tool in the direction of the tool counter-element is started and at the same time or chronologically afterwards irradiation or illumination of the joining location with the light of the light source is ended. It is also conceivable that, relative to a joining operation of the workpiece by the joining tool unit, the joining tool unit be configured to start a movement of the movable tool after the end of the irradiation or illumination of the joining location with the light within a time range. For example, the range is between 0 milliseconds (ms) and 100 ms, for example, between 0 ms and 50 ms, for example, between 0 ms and 40 ms or, for example, between 0 ms and 30 ms.

Furthermore, it is conceivable that the joining tool unit have a sensor unit, wherein the joining tool unit is configured to detect by means of the sensor unit whether the holding-down member is placed against the workpiece in the position. To this end, for example, the sensor unit comprises a pressure sensor which detects a dynamic pressure inside the holding-down member.

For example, the sensor unit is configured to determine whether the holding-down member is placed at the position against the workpiece so that the holding-down member with the workpiece screens off light of the light source outwardly in a light-impermeable manner so that it is possible to prevent an employee from being endangered in the region surrounding the joining tool unit. In this case, for example, the sensor unit detects with a pressure sensor a dynamic pressure between the holding-down member and the workpiece.

For example, the joining tool unit checks, in particular, the control unit checks, whether a sensor value of the sensor unit is within a predetermined desired range before irradiation or illumination of the joining location of the arranged workpiece with the light of the light source is started and/or before a movement of the movable workpiece is started. If the sensor value is not within the predetermined desired range, the joining tool unit blocks, in particular, the control unit blocks, a start of the joining location of the arranged workpiece being irradiated or illuminated with the light of the light source and/or a start of a movement of the movable tool.

In a preferred embodiment, the control unit of the joining tool unit is configured in such a manner that irradiation or illumination of the joining location of the arranged workpiece with the light of the light source is ended before the movable tool can be introduced into a light beam of the light of the light source during its movement in the direction of the tool counter-element. For example, shortly before the movable tool enters the light beam of the light of the light source, the control unit switches off irradiation or illumination of the joining location of the arranged workpiece with the light of the light source. Heating of the movable tool is thereby prevented and therefore damage to the movable tool is prevented.

In an exemplary modification of the joining tool unit, the joining tool unit is configured in a first step to move the holding-down member up to a position in the direction of the tool counter-element, in a second step to start irradiation or illumination of the joining location by the light source, in a third step to start the movement of the movable tool, in a fourth step to end the illumination or irradiation and in a fifth step to move the holding-down member away out of the position relative to the tool counter-element. A comparatively safer joining process can thereby be carried out, with particular regard to a beam protection of an employee. The holding-down member is raised from the workpiece during operation of the joining tool unit preferably only when it is ensured that the light source, such as, for example, the laser, is switched off or deactivated.

For example, the steps one to five are carried out one after the other. For example, the joining tool unit is configured in the first step to move the holding-down member in the direction of the tool counter-element into a position and to retain it in the position, to carry out the steps two, three and four and subsequently to move the holding-down member back out of the position. For example, the holding-down member is in the position in contact with or touching a surface of the workpiece, in the arranged state of the workpiece on the joining tool unit. For example, the control unit is configured to control and/or to adjust the above-mentioned method steps. For example, the joining tool unit is configured so that a movement of the movable tool in the direction of the tool counter-element is started at the same time as or chronologically after the holding-down member touches or comes into contact with the workpiece.

It is also proposed that the holding-down member be configured in such a manner that, when a workpiece is in the state arranged on the joining tool unit, the holding-down member is arranged in the position placed against the surface of the workpiece so that the holding-down member surrounds the joining location of the workpiece so that a maximum of 20% of the radiation power of the light between the holding-down member and the surface of the workpiece radiates outwardly.

For example, the joining tool unit is configured in such a manner that, when a workpiece is in the state arranged on the joining tool unit, the holding-down member is arranged in the position placed against the surface of the workpiece so that the holding-down member surrounds the joining location of the workpiece so that a maximum of 20% of the radiation power, which arrives in the immediate region surrounding the location of the workpiece to be joined, of the light between the holding-down member and the surface of the workpiece radiates outwardly.

For example, the holding-down member is configured in such a manner that, when the holding-down member is in the position placed against the workpiece, from 0% to 30%, 0% to 20%, 0% to 25%, 0% to 15% or 0% to 10% of the radiation power of the light between the holding-down member and the surface of the workpiece radiates outwardly. For example, the holding-down member is configured in such a manner that, when the holding-down member is in the position placed against the workpiece, a maximum of 15% or a maximum of 10% of the radiation power of the light between the holding-down member and the surface of the workpiece radiates outwardly.

For example, the holding-down member comprises a recess. For example, the recess is located opposite the tool counter-element so that, when a workpiece is in the state arranged on the joining tool unit and when the holding-down member is in the state placed against the workpiece, the recess is located in the region around the joining location of the workpiece. For example, the first and second recesses each merge into the recess at one end. During the joining operation, for example, the movable tool engages in the recess or through the recess. For example, the recess is provided in the form of a hole in the holding-down member.

For example, the holding-down member is provided in such a manner that the holding-down member surrounds the recess so that in an ideal case the holding-down member completely surrounds the recess together with the workpiece in the state placed against the workpiece.

For example, the beam power of the light which exists when the light of the light source enters the region of the recess may be considered to be the beam power of the light of the light source. For example, the beam power of the light which acts on a workpiece which is arranged against the joining tool unit may be considered to be the beam power of the light of the light source.

For example, the beam power, which is discharged directly at the light source, of the light is greater than the beam power of the light of the light source which acts on a workpiece which is arranged on the joining tool unit, in particular, as a result of reflection and absorption losses of the light on its path from the light source as far as the joining location.

An exemplary embodiment of the present invention is a set of tool tongs with a tool bracket and a joining tool unit according to any one of the embodiments set out above.

For example, the tool bracket connects the movable tool to the tool counter-element so that a non-positive-locking connection is produced between the movable tool and the tool counter-element.

For example, the set of tool tongs is in the form of a clinching, joining and/or stamping set of tongs. It is also conceivable for the set of tool tongs to be provided in the form of a half-hollow set of riveting tongs and/or a solid set of stamping riveting tongs.

A joining operation of a workpiece by a joining tool unit is also proposed, for example, a joining operation of a workpiece by a joining tool unit according to any one of the embodiments set out above, wherein the joining operation has the successive method steps of:

arranging a workpiece which is intended to be processed on the joining tool unit, moving a holding-down member of the joining tool unit relative to a tool counter-element of the joining tool unit up to a position at which the holding-down member and the tool counter-element touch the workpiece, holding the holding-down member at the position, starting an irradiation or illumination of a joining location of the workpiece with a light of a light source of the joining tool unit if the holding-down member has reached the position.

Furthermore, it is proposed that the joining operation may include one of the following additional method steps:

detecting the position of the holding-down member by a sensor unit of the joining tool unit, checking by a control unit of the joining tool on the basis of the detection of the sensor unit whether the holding-down member has reached the position, starting a movement of a movable tool of the joining tool unit in the direction of the joining location of the workpiece in order to join the workpiece, ending the illumination or the irradiation of the joining location of the workpiece at the same time as the start of the movement of the movable tool of the joining tool unit in the direction of the joining location of the workpiece, chronologically after the start of the movement of the movable tool of the joining tool unit in the direction of the joining location of the workpiece or chronologically before the start of the movement of the movable tool of the joining tool unit in the direction of the joining location of the workpiece, checking by the joining tool unit whether during the joining operation of the workpiece by the movable tool the illumination or irradiation of the location to be joined of the workpiece is ended, joining the workpiece by the movable tool before the holding-down member is moved away from the position, moving the holding-down member away from the position after a movement of the movable tool in the direction of the location to be joined of the workpiece has been started, checking by the joining tool unit whether the illumination or irradiation of the location to be joined of the workpiece is ended before the holding-down member is moved away from the position.

On the one hand, a safety function is thereby performed, in particular, in order to prevent an employee from being endangered, and, on the other hand, a particularly undesirable heating of the movable tool can thereby be controlled.

BRIEF DESCRIPTION OF THE DRAWINGS

One exemplary embodiment is explained in greater detail with reference to the appended drawings with additional details and advantages being indicated.

FIG. 7 shows a sectioned view of the arrangement according to FIGS. 4 and 5, wherein a joining connection is produced on the workpiece; and FIG. 8 shows a sectioned view of the arrangement according to FIGS. 4, 5 and 7 in the initial position after the joining connection has been produced.

DETAILED DESCRIPTION OF THE INVENTION

Figure 1:
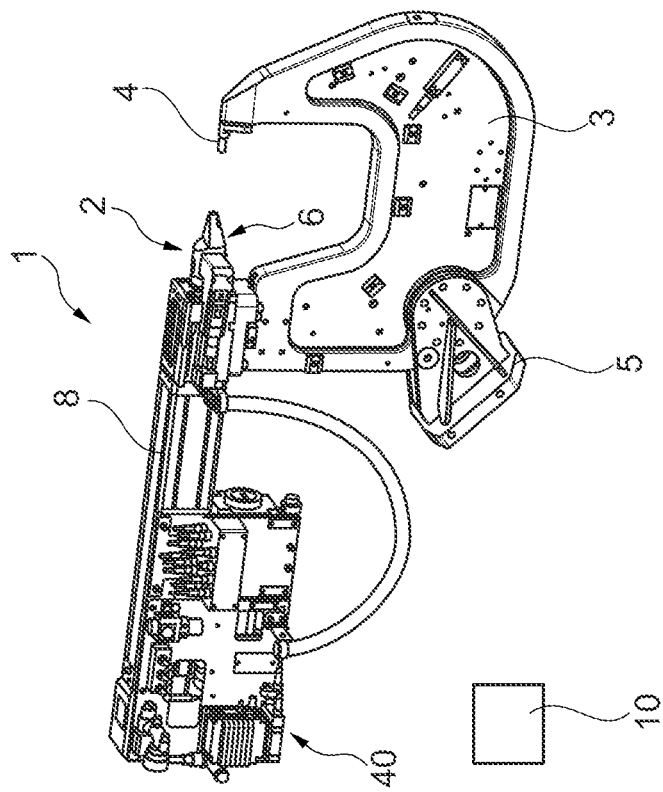
FIG. 1 shows a perspective view obliquely from above of a set of tool tongs with a joining tool unit.

FIG. 1 illustrates a set of tool tongs 1 with a joining tool unit 2. The set of tool tongs 1 has a tool bracket 3, wherein the joining tool unit 2 is arranged on the tool bracket 3. The tool bracket 3 is preferably in the form of a C-shaped bracket and may, for example, be fixed via a connection element 5 to a robot arm which is not illustrated in FIG. 1.

Figure 2:
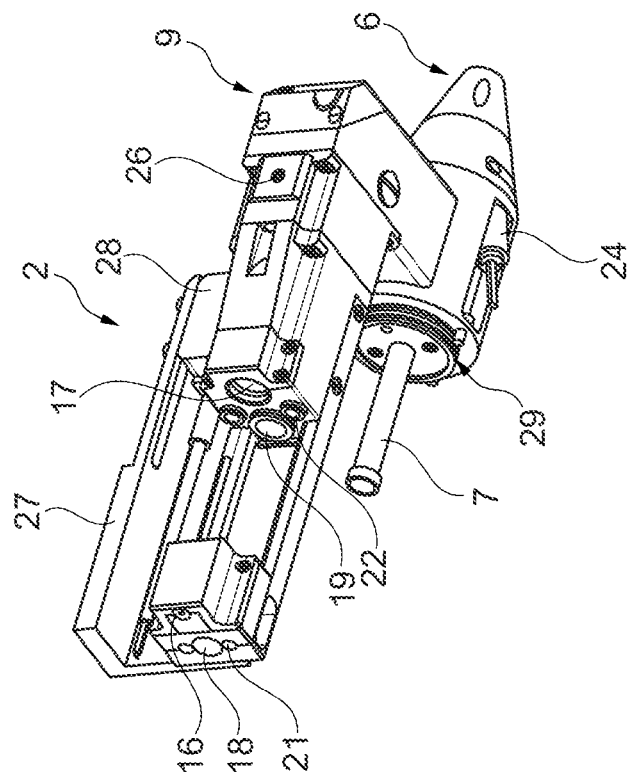
FIG. 2 shows a perspective view of a portion of the joining tool unit.

A tool counter-element 4, a holding-down member 6, a movable tool 7 (see FIG. 2), a drive unit 8, a light source 10 and a control unit 40 are formed on the joining tool unit 2.

The drive unit 8 may be in the form of an electric, pneumatic, hydraulic or hydraulic/pneumatic drive. The drive unit 8 is connected, for example, to the tool bracket 3.

For example, the movable tool 7, a pyrometer 24 and a light guiding system 9 are arranged on the holding-down member 6. The light guiding system 9 comprises a collimator 11, a first mirror 12, a second mirror 13, a beam trap 14 or beam sump and a protective glass 15 (see FIG. 4). For example, the light source 10 is in the form of a laser, in particular, a fiber laser. The collimator 11 is preferably configured in such a manner that a collimated light beam is produced, for example, a collimated laser beam is produced. For example, the light beams of the light source 10 are expanded and orientated at least substantially parallel with each other. The first mirror 12 is adjustable, for example, so that the position of a light beam of the light source 10 on a workpiece 25 to be processed can be adjusted. The second mirror 13 is preferably arranged so as to be fixed in position on the joining tool unit 2. The protective glass 15 forms, for example, a separation location between the optical units or the mirrors 12, 13 and the collimator 11 of the light guiding system 9 and the holding-down member 6.

Furthermore, the beam diameter of the light beam can be adjusted by an adjustment element 26 at the outer side of the joining tool unit 2. At the end of the beam trap 14 or the beam sump, there is preferably formed a cooling plate 31 which cools the beam trap 14 or the beam sump. The cooling plate 31 is preferably releasably arranged at an outer side of the holding-down member 6 and, consequently, the cooling plate 31 can be changed or cleaned, for example, in the event of wear or contamination.

The joining tool unit 2 preferably has insertion positions 16, 17 in order to couple the light source 10 to the joining tool unit 2. For example, insertion positions 18, 19 for a discharge line 20 and insertion positions 21, 22 for an inlet 23 are also provided on the joining tool unit so that a fluid can be poured in at the inlet 23 or discharged at the discharge line 20. For example, the fluid is in the form of a gas, for example, air, particularly air which is purged of particles. For example, the fluid is provided as a cleaned gas which is free from particles. It is also conceivable for the fluid to be provided in the form of a special gas, such as, for example, nitrogen or carbon dioxide.

A standard set of tool tongs can subsequently be provided with a portion of the joining tool unit 2, in particular, a holding-down member 6 and a light guiding system 9, by the holding-down member 6 and the light guiding system 9 being connected to a drive 8 which is preferably arranged on a tool bracket 3. To this end, the joining tool unit 2 preferably has a fixing element 27, wherein a portion of the joining tool unit 2, in particular, the portion of the joining tool unit 2 on which the insertion positions 16, 17, 18, 19, 21, 22 are formed, can be connected to the drive 8 by the fixing element 27. Furthermore, the holding-down member 6 has a connection element 29 for connection to the drive 8. The fixing element 27 is preferably made from a plate-like material, in particular, metal. The fixing element 27 can be connected to the drive 8 by fixing means 30, for example, screws. For example, a safety switch 28 is arranged on the fixing element 27.

Figure 4:
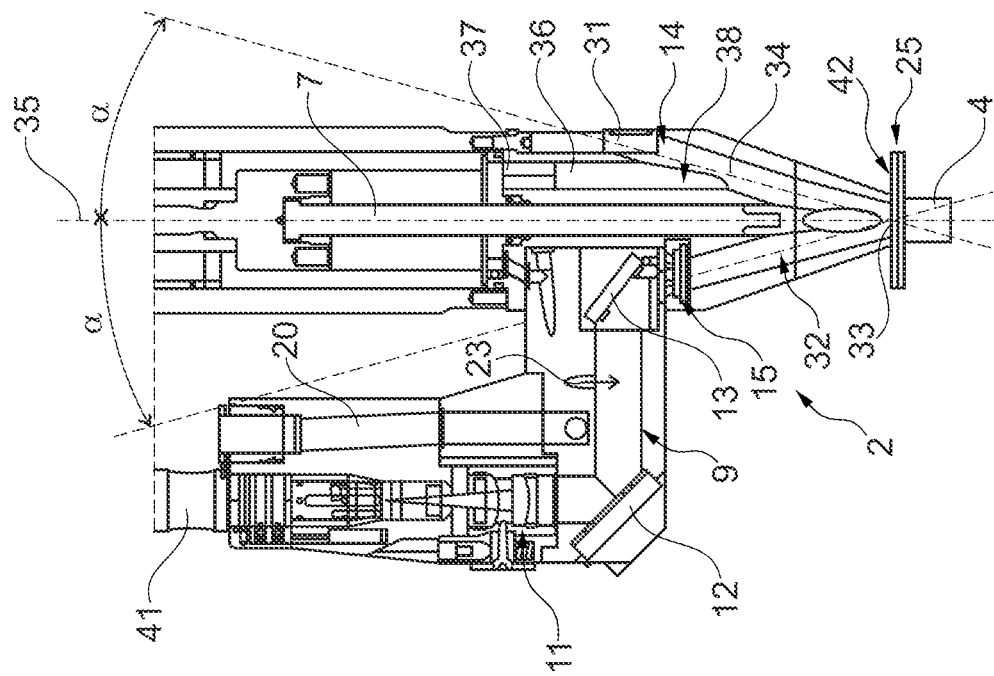
FIG. 4 shows a sectioned view of a portion of the joining tool unit according to FIG. 1, wherein the joining tool unit adjoins a workpiece with a holding-down member and a tool counter-element, and wherein a path of a light beam is indicated.
Figure 3:
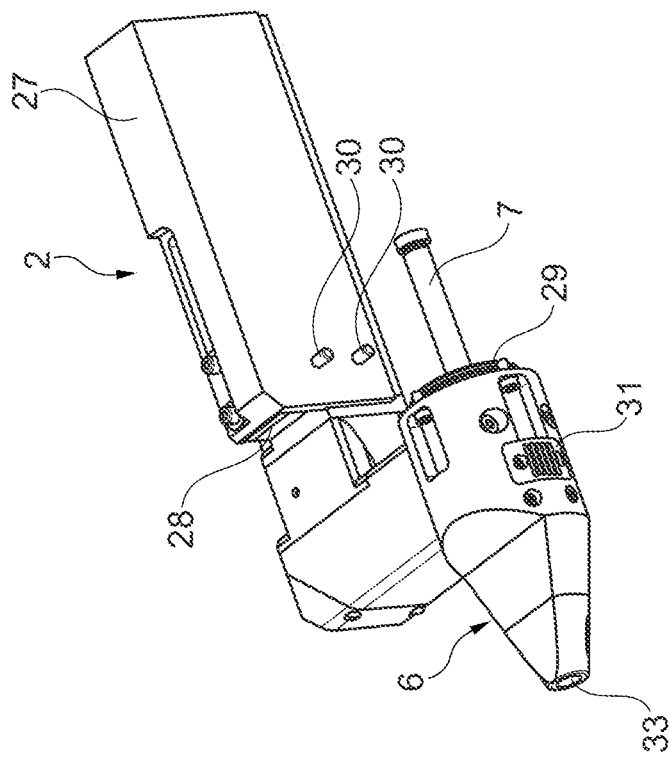
FIG. 3 shows another perspective view of the portion of the joining tool unit according to FIG. 2.

FIGS. 4, 5, 6, 7 and 8 illustrate a sectioned view of the joining tool unit 2. From the light source 10, a light beam of the light source is coupled into the light guiding system 9 in the region 41. The path of the light beam is schematically illustrated in FIG. 4 by arrows L. The light beam travels, for example, from the light source which is not illustrated in FIG. 4, to the region 41 and travels onward to the collimator 11, wherein the light beam is subsequently reflected, for example, on the first mirror 12 and on the second mirror 13, and, for example, reaches the holding-down member 6 through the protective glass 15. A first recess 32 is formed in the holding-down member 6, wherein the first recess 32 is, for example, a hole in the holding-down member 6. For example, the light beam L travels through the first recess 32 to a recess 33, which is formed at an end of the holding-down member 6 on the workpiece. If the holding-down member 6 is positioned on a workpiece 25, the light beam L is reflected on the preferably metal workpiece surface 42 of the workpiece 25 and reaches a second recess 34 which is in the form, for example, of a hole in the holding-down member 6. At the end of the second recess 34, the beam trap 14 or the beam sump is formed so that the light beams which are reflected by the workpiece 25 are captured and absorbed in the beam trap 14 or the beam sump.

For example, an additional hole for the movable tool 7 is provided on the holding-down member 6 so that the movable tool 7 can be moved linearly along a movement axis 35 in the direction of the workpiece 25. The movement axis 35 preferably extends along a longitudinal extent of the movable tool 7. Furthermore, the movement axis 35 extends, for example, centrally through the movable tool 7. A longitudinal axis of the first recess 32 or the second recess 34 is, for example, provided in an angular range a between 5° and 40° relative to the movement axis 35 of the movable tool 7 on the holding-down member 6. Preferably, the second recess 34 is configured in a mirror-symmetrical manner relative to the first recess 32, wherein the movement axis 35 is, for example, a component of a mirror plane.

For example, portions of the light guiding system 8 form the flow channel 38. For example, the first and second recesses 32, 34 of the light guiding system 8 and the recess 33 form a portion of the flow channel 38. For example, the flow channel 38 mainly extends along the light guiding system 8, wherein the flow channel 38 begins only after the collimator 11. Furthermore, the flow channel 38 has an additional, second recess 36 which is preferably in the form of a hole. For example, the second recess 36 adjoins a portion of the second recess 34 and extends parallel with the movement axis 35 of the movable tool 7. The fluid travels via the inlet 23 into the flow channel 38 and can flow along the flow channel 38. For example, the fluid is blocked in the region after the collimator 11 as far as the protective glass 15 because the fluid can flow only at the outer sides of the protective glass 15 to the first recess 32. In the region after the collimator 11 as far as the protective glass 15, an excess pressure is thereby generated as long as the fluid flows through the inlet 23. For example, fluid continuously flows in via the inlet 23 in order to keep the optical units or the mirrors 12, 13 clean. The fluid can flow out of the flow channel 38 through the recess 33 and a second outlet 37. The second outlet 37 is preferably arranged at the end of the recess 36, wherein the second outlet 37 is connected to the discharge line 20, for example, so that the incoming fluid can be discharged at the end of the recess 36. For example, a discharge line 20, from which the fluid can be discharged from the flow channel 38, is arranged on the flow channel 38.

For example, the fluid is admitted over the entire joining operation through the inlet 23 into the flow channel 32, wherein the fluid flows out of the recess 33 as long as the holding-down member 6 is not positioned on the workpiece 25. For example, initially the joining tool unit 2 is moved for a joining operation in the direction of the workpiece 25 to be processed until the holding-down member 6 and the tool counter-element 4 abut the workpiece. As soon as the holding-down member 6 is positioned on the workpiece 25, the drive 8 moves the movable tool 7 along the movement axis 35 in the direction of the workpiece 25 into a start position according to FIG. 5. This constitutes an initial position of the movable tool 7. A spacing between the movable tool 7 and workpiece 25 is thereby minimized so that the movable tool 7 has a comparatively short travel path to the workpiece 25.

For example, as a result of the movement of the movable tool 7 by the drive 8, a resilient element is biased, whereby the holding-down member 6 is pressed with a force of the resilient element against the workpiece 25. The holding-down member 6 is thereby pressed particularly securely against the workpiece 25, whereby a discharge of light between the holding-down member 6 and the workpiece 25 is intended to be prevented. Furthermore, as a result of the high pressing force of the holding-down member 6 on the workpiece 25 which abuts the holding-down member 6, heat from a first workpiece portion of the workpiece 25 which is in contact with the holding-down member can be transmitted in an improved manner to a second workpiece portion of the workpiece 25 which abuts the tool counter-element 4.

For example, a check is subsequently carried out as to whether the holding-down member 6 abuts the workpiece 25 as desired. To this end, for example, the position of the movable tool 7 is initially determined by the control unit 40. For example, the position of the safety switch 28 is further established and therefore the position of the holding-down member and the light guiding system 9 is checked. For example, after both checks provide the desired results and have been identified as being correct, the pressure inside the flow channel 38 is determined.

For example, in order to determine the pressure, the second outlet 37 or a valve for the pump at the discharge line 20 is closed (see FIG. 4). The fluid is thereby blocked within the flow channel 38 when the recess 33 is covered at the holding-down member 6 by the workpiece 25 and when the flow channel 38 or the light guiding system 9 does not have any damage. For example, the pressure in the flow channel 38 is measured by a sensor (not illustrated). The pressure measured by the sensor is communicated to the control unit 40, wherein the control unit 40 compares the pressure measured by the sensor with a predetermined threshold value. The threshold value is preferably selected in such a manner that even with a narrow gap between the holding-down member 6 and the workpiece 25 the pressure measured by the sensor in the flow channel 38 cannot exceed the threshold value. It is thereby ensured that the light source 10 can be activated only when the holding-down member 6 is positioned in a desired manner, for example, in a perpendicular manner, on the workpiece 25 so that no light radiation is discharged outwardly.

Figure 5:
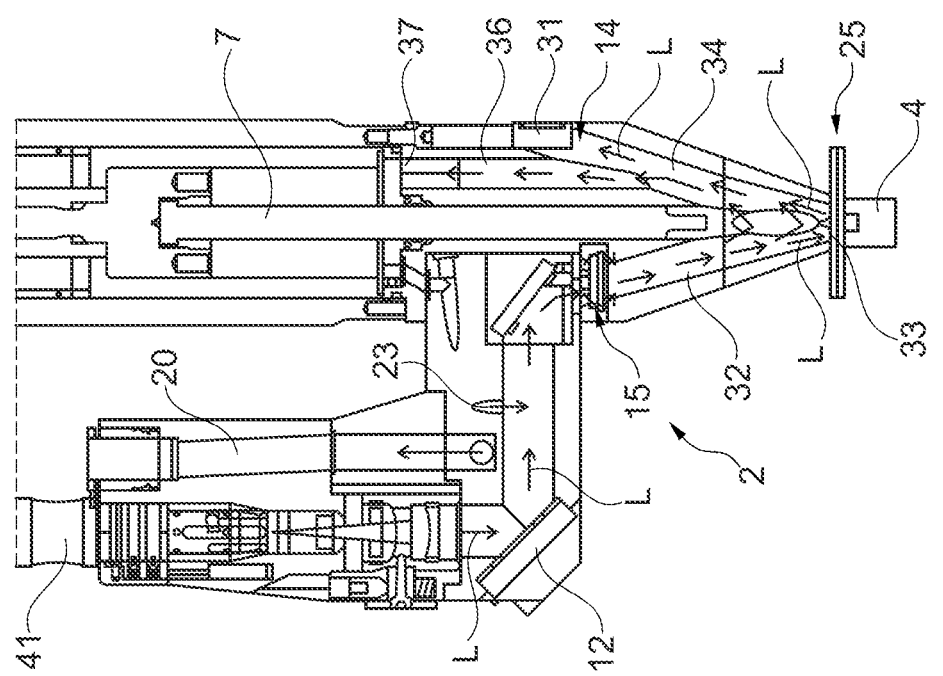
FIG. 5 shows a sectioned view of the arrangement according to FIG. 4, wherein a path of an air flow is indicated.

For example, after checking the pressure in the flow channel 3, the second outlet and/or a valve for the pump of the discharge line is opened so that a flow in the flow channel 38 is produced again (see FIG. 5, arrows). The fluid consequently flows from the inlet 23 to the second mirror 13, to the protective glass 15 along the first recess 32 to the second recess 34 along the recess 36 to the second outlet 37 and is discharged at the second outlet 37. Consequently, contamination from the flow channel 38 is removed by the flow in the flow channel 38.

For example, the control unit activates the light source 10 as soon as the flow in the flow channel 38 is formed. For example, the workpiece 25 is heated by the light beams of the light source 10, wherein a portion of the light beams, particularly when the surface has not yet been heated, is reflected on the workpiece 25. The reflected light radiation travels along the second recess 34 to the beam traps 14 or beam sump. A protection from beams is thereby ensured without any additional beam protection cab.

Figure 6:
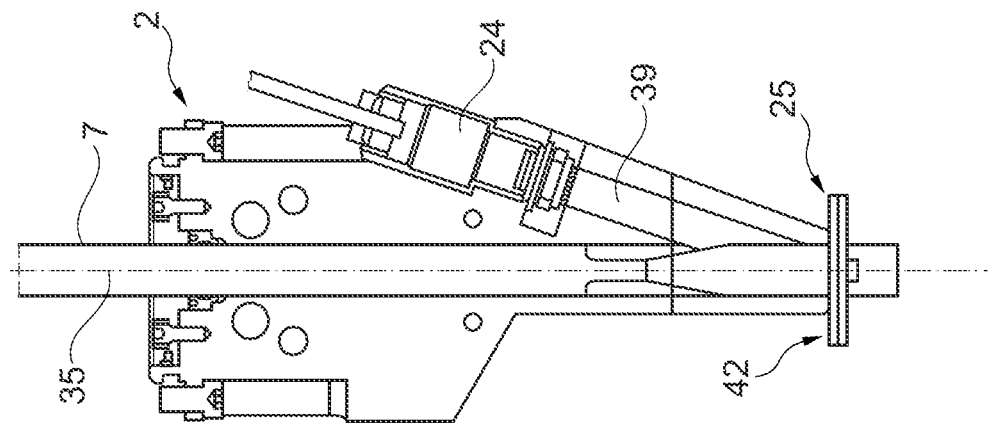
FIG. 6 shows a sectioned view of a portion of the joining tool unit with a pyrometer.

For example, the temperature at the workpiece is measured by the pyrometer 24 (see FIG. 6). The pyrometer 24 is arranged on the holding-down member 6, wherein a hole 39 in the holding-down member 6 is formed. For example, the hole 39 is provided in the holding-down member 6 in a state rotated through 90° about the movement axis 35 relative to the first recess 32. A thermal radiation of the workpiece via the hole 39 can thereby reach the pyrometer 24, whereby a temperature of the workpiece 25, in particular, a temperature of the workpiece 25 at the joining location of the workpiece can be established. For example, the pyrometer 24 transmits the measured temperature to the control unit 40, wherein in the control unit 40 the temperature to be reached is stored and is compared with the measured value. The control unit has stored, for example, temperatures which are intended to be reached for different materials. For example, if the temperature to be reached is reached before a specific time period, the light source 10 is deactivated. The joining operation is initially stopped if the temperature to be reached cannot be reached in the specific time period.

For example, particularly directly before the light source 10 is switched off or at the same time as the light source 10 is switched off, a movement of the movable tool 7 in the direction of the tool counter-element 4 is started so that the workpiece 25 is joined at the joining location (FIG. 7). For example, the control unit 40 is configured to check whether the light source 10 and therefore an illumination of the workpiece 25 is switched off when the movable tool 7 reaches a region of the radiation path of the light beams of the light source 10 on its path in the direction of the tool counter-element 4.

It is thereby intended to prevent the movable tool 7 from becoming heated in an undesirable manner by irradiation with light beams of the light source 10. Similarly, the safety of an employee at the joining tool unit 2 is thereby intended to be ensured. However, it is also conceivable for the control unit initially to check whether the light source 10 and therefore an illumination of the workpiece 25 is switched off and only after the switched-off light source 10 has been checked is a movement of the movable tool 7 activated.

For example, during production of the joining connection, particularly continuously a flow in the flow channel 38 is present so that contamination which occurs when the joining connection is produced can be transported away.

For example, the movable tool 7 is moved back after the end of the joining operation into an initial position according to FIG. 4. For example, the second outlet 37 is subsequently closed. For example, the joining tool unit 2 is subsequently moved away from the workpiece 25, in particular, the holding-down member 6, by the drive 8. For example, fluid continuously flows through the inlet 23 in the direction of the recess 33 so that the optical units do not become contaminated, including during down-times.

LIST OF REFERENCE NUMERALS

1 Set of tool tongs
2 Joining tool unit
3 Tool bracket
4 Tool counter-element
5 Connection element
6 Holding-down member
7 Tool
8 Drive unit
9 Light guiding system
10 Light source
11 Collimator
12 Mirror
13 Mirror
14 Beam sump
15 Protective glass
16 Insertion position
17 Insertion position
18 Insertion position
19 Insertion position
20 Discharge line
21 Insertion position
22 Insertion position
23 Inlet
24 Pyrometer
25 Workpiece
26 Adjustment element
27 Fixing element
28 Safety switch
29 Connection element
30 Fixing means
31 Cooling plate
32 Recess
33 Recess
34 Recess
35 Movement axis
36 Recess
37 Outlet
38 Flow channel
39 Hole
40 Control unit
41 Region
42 Workpiece surface

The invention claimed is:

1. A joining tool unit comprising a holding-down member, a movable tool, a tool counter-element, a drive unit, a light source and a control unit, wherein the holding-down member and the movable tool are provided opposite the tool counter-element, wherein the holding-down member can be moved in the direction of the tool counter-element by the drive unit, wherein the joining tool unit is configured to join a workpiece which is arranged on the joining tool unit by a movement of the movable tool relative to the tool counter-element, wherein the control unit is configured to control and/or adjust the drive unit, wherein the control unit is configured to control and/or adjust the light source, wherein the joining tool unit is configured to move the holding-down member in the direction of the tool counter-element as far as a position, at which the holding-down member and the tool counter-element touch the workpiece which is arranged on the joining tool unit, wherein the joining tool unit is configured to begin irradiation or illumination of a joining location of the workpiece with the light of the light source when the holding-down member has reached the position, wherein the holding-down member has a light guiding system, wherein the holding-down member comprises a beam trap or a beam sump, in which the reflected light is trapped and absorbed.

2. The joining tool unit as claimed in claim 1, wherein the light guiding system is provided on the holding-down member in such a manner that a light beam of the light of the light source shines on the joining location of the workpiece exclusively at an angle greater than 0° relative to a movement axis of the movable tool.

3. The joining tool unit as claimed in claim 1, wherein the holding-down member is movable by the drive unit in the direction of the tool counter-element.

4. The joining tool unit as claimed in claim 1, wherein the control unit of the joining tool unit is configured to end irradiation or illumination of the joining location of the arranged workpiece with the light of the light source at the same time as the start of the movement of the movable tool or chronologically after the start of the movement of the movable tool.

5. The joining tool unit as claimed in claim 1, wherein the joining tool unit is configured in a first step to move the holding-down member up to a position in the direction of the tool counter-element, in a second step to start irradiation or illumination of the joining location by the light source, in a third step to start the movement of the movable tool, in a fourth step to end the illumination or irradiation and in a fifth step to move the holding-down member away out of the position relative to the tool counter-element.

6. The joining tool unit as claimed in claim 1, wherein the holding-down member is configured in such a manner that, when a workpiece is in the state arranged on the joining tool unit, the holding-down member is arranged in the position placed against the surface of the workpiece so that the holding-down member surrounds the joining location of the workpiece so that a maximum of 20% of the radiation power of the light between the holding-down member and the surface of the workpiece radiates outwardly.

7. A set of tool tongs having a joining tool unit as claimed in claim 1 and having a tool bracket.

8. A joining operation of a workpiece by a joining tool unit as claimed in claim 1, having the successive method steps of:

arranging a workpiece which is intended to be processed on the joining tool unit, moving a holding-down member of the joining tool unit relative to a tool counter-element of the joining tool unit up to a position at which the holding-down member and the tool counter-element touch the workpiece, holding the holding-down member at the position, starting an irradiation or illumination of a joining location of the workpiece with a light of a light source of the joining tool unit if the holding-down member has reached the position, trapping and absorbing the reflected light of the light source of the joining tool unit by means of a beam trap or a beam sump of the holding-down member of the joining tool unit.

9. The joining operation as claimed in claim 8, having the following additional method step:

starting a movement of a movable tool of the joining tool unit in the direction of the joining location of the workpiece in order to join the workpiece.

10. The joining operation as claimed in claim 8, having the following additional method steps:

ending the irradiation or illumination of the joining location of the workpiece, moving the holding-down member away from the position.

11. The joining operation as claimed in claim 8, having the following additional method steps:

ending the illumination or the irradiation of the joining location of the workpiece at the same time as the start of the movement of the movable tool of the joining tool unit in the direction of the joining location of the workpiece or chronologically after the start of the movement of the movable tool of the joining tool unit in the direction of the joining location of the workpiece.

* * * * *